United States Patent [19]

Staendeke et al.

[11] 4,347,334

[45] Aug. 31, 1982

[54] PARTICULATE AGENT FOR IMPEDING THE COMBUSTIBILITY OF COMBUSTIBLE SUBSTANCES

[75] Inventors: Horst Staendeke; Franz-Josef Dany; Joachim Kandler, all of Erftstadt, Fed. Rep. of Germany

[73] Assignee: Hoechst Aktiengesellschaft, Fed. Rep. of Germany

[21] Appl. No.: 231,377

[22] Filed: Feb. 4, 1981

[30] Foreign Application Priority Data

Feb. 13, 1980 [DE] Fed. Rep. of Germany ....... 3005252

[51] Int. Cl.$^3$ ................................................ C08K 3/32
[52] U.S. Cl. ................................... 524/416; 524/594; 521/85
[58] Field of Search ................................. 260/45.9 NP

[56] References Cited

U.S. PATENT DOCUMENTS 3,397,035  8/1968  Shen et al. ................. 260/45.9 NP
3,423,343  1/1969  Barnett ....................... 260/45.9 NP
4,244,858  1/1981  Tacke et al. ................ 260/45.9 NP

OTHER PUBLICATIONS

Cassell's New German & English Dictionary, Funk & Wagnall's Co., New York, New York, (1939), p. 623.

*Primary Examiner*—V. P. Hoke
*Attorney, Agent, or Firm*—Connolly and Hutz

[57] ABSTRACT

The invention relates to a particulate agent based on a free-flowing pulverulent ammonium polyphosphate for impeding the combustibility of combustible substances, the agent containing (a) about 75 to 99.9 weight % of ammonium polyphosphate and
(b) about 0.1 to 25 weight % of a hardened, water-insoluble phenol resin (phenol/formaldehyde-resin) enveloping the individual ammonium polyphosphate particles.

7 Claims, No Drawings

PARTICULATE AGENT FOR IMPEDING THE COMBUSTIBILITY OF COMBUSTIBLE SUBSTANCES

The present invention relates to a particulate agent based on free-flowing pulverulent ammonium polyphosphates for impeding the combustibility of combustible substances.

It is generally known in the art that ammonium polyphosphates can be used for flameproofing plastics. A process for making flame-retardant polyurethanes from high molecular weight polyhydroxyl compounds, polyisocyanates and catalysts has been described, for example, in German Patent Specification "Auslegeschrift" 1,283,532, wherein it has been suggested that an ammonium polyphosphate of the general formula:

$$H_{(n-m)+2}(NH_4)_m P_n O_{3n+1}$$

in which n is a whole number with an average value of more than 10, m is a whole number of up to n+2, and the ratio of m/n is between about 0.7 to 1.1, should be used as a flame-proofing agent additive.

Although ammonium polyphosphates of the above formula have been found to impart good flameretardant properties to polyurethanes, they are not fully satisfactory inasmuch as they are insufficiently water-insoluble and therefore liable to become washed out from the plastics in the course of time, under outdoor conditions.

In column 3 of German Patent Specification "Auslegeschrift" 1,283,532, the ammonium polyphosphates are said to be practically water-insoluble. Despite this, they present a remarkable solubility as results from the fact that up to 5 g of the ammonium polyphosphate is dissolved upon suspending 10 g thereof in 100 cm³ of water at 25° C. In other words, the ammonium polyphosphate has up to 50% soluble ingredients therein.

In the preparation of self-extinguishing soft polyurethane foams e.g. by the process described in German Patent Specification "Auslegeschrift" 2,313,819, wherein a polyester polyol, which has trimethylolpropane incorporated therein, is subjected to polycondensation with an organic polyisocyanate in the presence of at least 10 parts by weight of ammonium polyphosphate, per 100 parts by weight of polyol, it is the viscosity of the feed mixture which renders homogenization so difficult. In the presence of 30 weight % of ammonium polyphosphate with a degree of condensation n equal to about 700, the feed mixture presents a viscosity of about 70,000 mPa.s which makes it difficult for it to be stirred or kneaded. This high viscosity results from the addition of the ammonium polyphosphate which is known to swell in water and form a gel. This gel-effect turns out disadvantageous whenever the feed mixture already has a viscous polyol component therein. A commercially used polyester polyol which is based on adipic acid, diethylene glycol and a triol has a viscosity of more than 20,000 mPa.s at 25° C., for example. As a result, it has been necessary heretofore to use a non-swelling ammonium polyphosphate with a low degree of condensation n smaller than 400, which however is more water-soluble than high-condensed phosphates and therefore partially washed out from plastics under outdoor conditions.

It is therefore desirable to have an agent and means for reducing the solubility of ammonium polyphosphates in water for use as flameproofing agents which are practically no longer liable to be washed out from plastics, under outdoor conditions. It is also desirable to have ammonium polyphosphates of which the addition to a batch that already has viscous polyester polyols therein does not result in the viscosity of the batch being additionally increased.

These requirements are met by the agent of this invention which relates more particularly to a particulate agent based on a free-flowing pulverulent ammonium polyphosphate of the general formula:

$$H_{(n-m)+2}(NH_4)_m P_n O_{3n+1}$$

in which n stands for a whole number with an average value of about 20 to 800, the ratio of m/n is about 1, for impeding the combustibility of combustible substances, the agent containing (a) about 75 to 99.9 weight % of ammonium polyphosphate and
(b) about 0.1 to 25 weight % of a hardened, water-insoluble phenol resin (phenol/formaldehyde-resin) embedding (enveloping) the individual ammonium polyphosphate particles.

The agent of this invention preferably consists of particles with an average size of about 0.01 to 0.05 mm, the degree of condensation n of the ammonium polyphosphates being preferably a whole number with an average number of 450 to 800, determined by the terminal group titration method (van Wazer), Griffiter and McCullough, Anal. Chem. 26, page 1755 (1954).

It is also preferable for the present agent to contain the phenol resin (phenol/formaldehyde-resin) in a proportion of about 0.1 to 10 weight %.

The phenol resin should preferably be an alcohol-soluble hardenable non-plasticizable phenol resin (phenol/formaldehyde-resin) or a thermosetting phenol resin.

The invention finally relates to the use of the present agent in flameproofing polyurethanes or polyurethane foams, the polyurethane foams containing the present agent in a proportion of 5 to 50 weight %, based on the alcoholic component of the polyurethane.

The phenol resins are applied to the ammonium polyphosphate particles either in an alcoholic resin solution or by hardening the resin while agitating the ammonium polyphosphate/resin-suspension, or by evaporating the solvent from the suspension in a heated kneader and successive heat-setting treatment, or by spray-drying the suspension.

The step of envelopment of the ammonium polyphosphate particles in a hardened phenol resin (phenol/formaldehyde-resin) results in the solubility of the ammonium polyphosphate in water being considerably reduced which is so desirable for the use of the ammonium polyphosphate as a flameretardant agent in polyurethane foams.

Also, it is possible for the present agent to be added as a flameretardant agent to feed mixtures as normally used for making polyurethane foams without the viscosity of those feed mixtures being increased so that they can be processed without difficulties.

The properties of the present agent and its technically beneficial effects are more fully described in the following Examples. The tests described therein were made on a commercially available ammonium polyphosphate and on various, equally commercially available phenol resins. Concerned were more particularly the following products:

1. EXOLIT 263 (this is a registered Trade Mark of Hoechst Aktiengesellschaft, Frankfurt/Main). This is a fine particulate, difficultly water-soluble ammonium polyphosphate of the formula $(NH_4PO_3)_n$, in which n stands for about 700.
2. PHENODUR PR 101 (this is a registered Trade Mark of Hoechst Aktiengesellschaft, Frankfurt/Main). This is a thermosetting phenol resol; dynamic viscosity at 20° C.=150–250 mPa.s; density at 20° C.=1.167 g/ml.
3. PHENODUR PR 121 (this is a registered Trade Mark of Hoechst Aktiengesellschaft, Frankfurt/Main). This is a liquid thermosetting phenol resol; dynamic viscosity at 20° C.=150–250 mPa.s; density at 20° C.=1.219 g/ml.
4. PHENODUR PR 373 (this is a registered Trade Mark of Hoechst Aktiengesellschaft, Frankfurt/Main). This is an alcohol-soluble, hardenable, unplasticized phenol resin; dynamic viscosity at 20° C.=50–70 mPa.s; density at 20° C.32 1.26 g/ml.
5. PHENODUR PR 285 (this is a registered Trade Mark of Hoechst Aktiengesellschaft, Frankfurt/Main). This is a hardenable unplasticized phenol resin; dynamic viscosity of a 55% solution in isobutanol at 20° C.=90–140 mPa.s; density of solution at 20° C.=0.99 g/ml.
6. DESMOPHEN 2200 (this is a registered Trade Mark of Bayer Aktiengesellschaft, Leverkusen). This is a slightly branched polyester based on adipic acid, diethyleneglycol and a triol; hydroxyl number=60; viscosity at 75° C.=1000 mPa.s; density at 20° C.=1.13 g/ml; water-content less than 0.1%. DESMOPHEN 2200 is used for making polyester-based polyurethane foams.

EXAMPLE 1

200 g of EXOLIT 263 was placed in a laboratory kneader, heated therein to 100° C. and admixed, within 15 minutes, with a solution of 30.8 g of PHENODUR PR 101 in 70 ml of methanol. The resulting mixture was kneaded for 2 hours at 100°–105° C., while methanol was evaporated, so as to obtain a dry product. The product consisted of particles with an average size of 0.04 mm and was obtained in a yield of 210.5 g. The product contained a 9.5 weight % proportion of phenol/formaldehyde resin.

To determine the effect of the above product on the viscosity of DESMOPHEN 2200, 30 g of product was stirred into 70 g of DESMOPHEN 2200 and the whole was treated for about 1 hour at 25° C. Next, the mixture was tested for its viscosity with the use of a Brookfield-viscometer RVT, spindle C at 5 rpm. The test result obtained is indicated in the Table hereinafter.

To determine the proportion of water-soluble matter, 10 g of product was suspended in 100 ml of water and the suspension was stirred for 20 minutes at 25° C. Next, the proportion of matter not dissolved in the water, was deposited within 40 minutes by centrifugation. 5 ml of the supernatant clear solution was placed by means of a pipet in an aluminum dish weighed earlier, and evaporated at 120° C. in a drying cabinet. The proportion of water-soluble matter was calculated from the quantity of evaporation residue. The result obtained is indicated in the Table hereinafter.

EXAMPLE 2

The procedure was as in Example 1, but a solution of 30.8 g of PHENODUR PR 121 in 70 ml of methanol was used. 211 g of a product containing a 9.5 weight % proportion of phenol/formaldehyde resin was obtained. The product was tested for viscosity and water-soluble matter as in Example 1. The test results obtained are indicated in the Table hereinafter.

EXAMPLE 3

The procedure was as in Example 1, but a solution of 29.4 g of PHENODUR PR 271 in 70 ml of methanol was used. 212.5 g of a product containing a 9.4 weight % proportion of phenol/formaldehyde resin was obtained. The product was tested for viscosity and water-soluble matter as in Example 1. The test results obtained are indicated in the Table hereinafter.

EXAMPLE 4

The procedure was as in Example 1, but a solution of 20.0 g of PHENODUR PR 373 in 100 ml of methanol was used. 214 g of a product containing a 9.4 weight % proportion of phenol/formaldehyde-resin was obtained. The product was tested for viscosity and water-soluble matter as in Example 1. The test results obtained are indicated in the Table hereinafter.

EXAMPLE 5

The procedure was as in Example 1, but a solution of 36.4 g of PHENODUR PR 285 in 70 ml of methanol was used. 215 g of a product containing a 9.3 weight % proportion of phenol/formaldehyde-resin was obtained. The product was tested for viscosity and water-soluble matter as in Example 1. The test results obtained are indicated in the Table hereinafter.

EXAMPLE 6

The procedure was as in Example 1, but a solution of 18.2 g of PHENODUR PR 285 in 35 ml of methanol was used. 209 g of a product containing a 4.8 weight % proportion of phenol/formaldehyde-resin was obtained. The product was tested for viscosity and water-soluble matter as in Example 1. The test results obtained are indicated in the Table hereinafter.

EXAMPLE 7

The procedure was as in Example 1, but a solution of 9.1 g of PHENODUR PR 285 in 20 ml of methanol was used. 212.5 g of a product containing a 2.5 weight % proportion of phenol/formaldehyde-resin was obtained. The product was tested for viscosity and water-soluble matter as in Example 1. The test results obtained are indicated in the Table hereinafter.

EXAMPLE 8

The procedure was as in Example 1, but a solution of 4.55 g of PHENODUR PR 285 in 10 ml of methanol was used. 200 g of a product containing a 1.3 weight % proportion of phenol/formaldehyde-resin was obtained. The product was tested for viscosity and water-soluble matter as in Example 1. The test results obtained are indicated in the Table hereinafter.

EXAMPLE 9

The procedure was as in EXAMPLE 1, but a solution of 1.8 g of PHENODUR PR 285 in 10 ml of methanol was used. 196 g of a product containing a 0.5 weight % proportion of phenol/formaldehyde-resin was obtained. The product was tested for viscosity and water-soluble matter as in Example 1. The test results obtained are indicated in the Table hereinafter.

EXAMPLE 10

The procedure was as in Example 1, but a solution of 0.4 g of PHENODUR PR 285 in 10 ml of methanol was used. 197 g of a product containing an 0.1 weight % proportion of phenol/formaldehyde-resin was obtained. The product was tested for viscosity and water-soluble matter as in Example 1. The test results obtained are indicated in the Table hereinafter.

EXAMPLE 11 (Comparative Example)

The procedure was as in Example 1, save that no phenol/formaldehyde-resin was added.

TABLE

| Example | Phenol/formaldehyde-resin | | Viscosity | | Proportion of water-soluble matter | |
|---|---|---|---|---|---|---|
| | Type: PHENODUR | Concentration (wgt %) | (mPa.s) | Change (%) | (wgt %) | Change (%) |
| 1 | PR 101 | 9.5 | 60 000 | −14 | 5.9 | −73 |
| 2 | PR 121 | 9.5 | 60 000 | −14 | 7.4 | −66 |
| 3 | PR 271 | 9.4 | 58 000 | −17 | 7.5 | −66 |
| 4 | PR 373 | 9.4 | 70 000 | ± 0 | 9.4 | −57 |
| 5 | PR 285 | 9.3 | 48 000 | −31 | 9.8 | −55 |
| 6 | PR 285 | 4.8 | 47 000 | −33 | 16 | −27 |
| 7 | PR 285 | 2.5 | 44 000 | −37 | 18 | −18 |
| 8 | PR 285 | 1.3 | 45 000 | −36 | 18 | −18 |
| 9 | PR 285 | 0.5 | 49 000 | −30 | 20 | −9 |
| 10 | PR 285 | 0.1 | 51 000 | −27 | 20 | −9 |
| 11 | — | — | 70 000 | — | 22 | — |

The data indicated in the above Table show that it is possible with the use of the present phenol resin (phenol/formaldehyde-resin) and inexpensive products significantly to improve the viscosity behaviour. This is more particularly true concerning PHENODUR PR 285. Used in a concentration of 0.5 weight %, it permits a viscosity value of less than 50,000 mPa.s to be established in a 30 weight % ammonium polyphosphate/polyester polyol suspension.

We claim:

1. Particulate agent, for impeding the combustibility of combustible substances, based on a free-flowing pulverulent ammonium polyphosphate of the general formula:

$$H_{(n-m)+2}(NH_4)_m P_n O_{3n+1}$$

in which n stands for a whole number with an average value of about 20 to 800 and the ratio m/n is about 1, and a phenol resin, the agent containing:
  (a) about 75 to 99.9 weight % of the free-flowing pulverulent ammonium polyphosphate, and
  (b) about 0.1 to 25 weight % of a hardened, water-insoluble phenol resin enveloping the individual ammonium polyphosphate particles.

2. Agent as claimed in claim 1, consisting essentially of particles having an average particle size of about 0.01 to 0.05 mm.

3. Agent as claimed in claim 1, wherein n is a whole number with an average value of 450 to 800.

4. Agent as claimed in claim 1, containing the phenol resin in a proportion of 0.1 to 10 weight %.

5. Agent as claimed in claim 1, wherein the phenol resin is a phenol/formaldehyde resin.

6. Agent has claimed in claim 1, wherein the phenol resin is an alcohol-soluble, hardenable non-plasticized phenol/formaldehyde resin which has been heat-set after said particles have been enveloped.

7. Agent as claimed in claim 1 or 6, wherein the phenol resin is a thermosetting resole which has been heat-set after said particles have been enveloped.

* * * * *